United States Patent

Schumacher

[11] 3,906,783
[45] Sept. 23, 1975

[54] INSTRUMENT FOR DETECTING THE PLASTIC FLOW POINT OF A METAL

[75] Inventor: John C. Schumacher, San Mateo, Calif.

[73] Assignee: J. C. Schumacher Co., Oceanside, Calif.

[22] Filed: June 3, 1974

[21] Appl. No.: 475,799

[52] U.S. Cl.................. 73/94; 73/88.5; 324/71 R; 324/72.5
[51] Int. Cl.².......................................... G01N 3/08
[58] Field of Search ....... 73/89, 88.5, 94; 324/71 R, 324/72.5, 32

[56] References Cited
UNITED STATES PATENTS

| | | | |
|---|---|---|---|
| 2,945,527 | 7/1960 | Bower et al. | 153/16 |
| 3,076,603 | 2/1963 | Gruber | 235/179 |
| 3,129,583 | 4/1964 | Cosner | 73/89 |
| 3,191,433 | 6/1965 | Hintermaier | 73/94 |
| 3,375,708 | 4/1968 | Preston | 73/89 |
| 3,439,532 | 4/1969 | Grumbach et al. | 73/89 |
| 3,477,286 | 11/1969 | Baker | 73/95 |
| 3,554,019 | 1/1971 | Van Den Hove et al. | 73/89 |

OTHER PUBLICATIONS
The Review of Scientific Instruments, Vol. 41, No. 2, February 1970, Stress Dependence of Contact Potential; Craig et al., pp. 258–264.

Physical Review B, Vol. 1, No. 8, April 1970; Contact-Potential Changes Produced on Metal Surfaces; French et al., pp. 3300–3303.

Primary Examiner—Richard E. Aegerter
Assistant Examiner—John W. Shepperd
Attorney, Agent, or Firm—Jessup & Beecher

[57] ABSTRACT

An instrument is provided for detecting the exact yield point of a sample at which plastic deformation and flow occurs as the stress is increased beyond the elastic limits of the material. The instrument measures the contact potential of the sample to determine the stress induced work function changes of the material, and to detect the significant work function change which occurs at the onset of plastic deformation. The instrument includes a stress inducing mechanism to exert a compressive or tensile stress on the sample and means, such as a Kelvin impulse or vibratory probe, for detecting the stress induced contact potential changes and corresponding work function changes to determine the exact point at which plastic deformation occurs in the sample.

7 Claims, 8 Drawing Figures

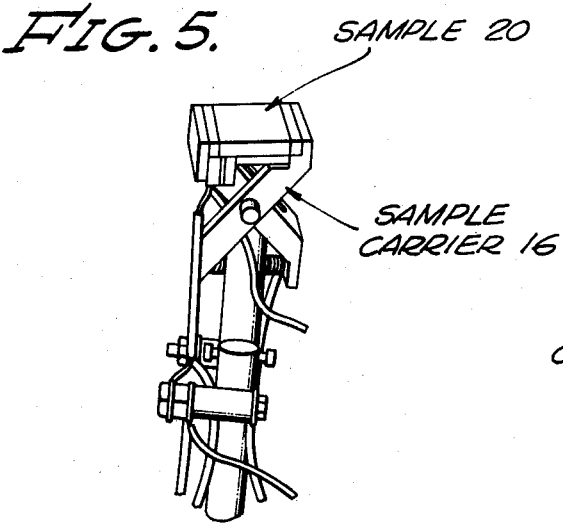
FIG. 5. SAMPLE 20 / SAMPLE CARRIER 16
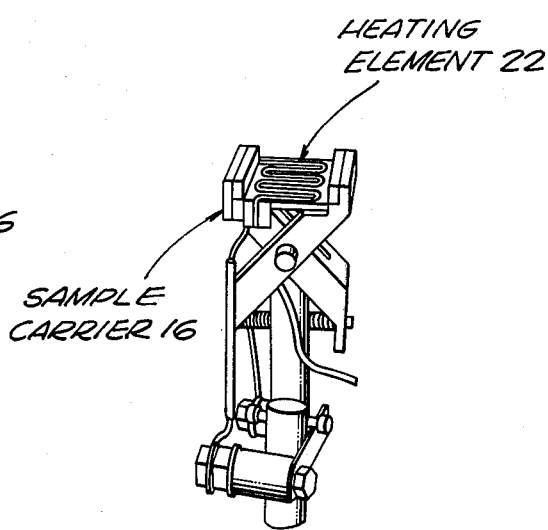
FIG. 6. HEATING ELEMENT 22 / SAMPLE CARRIER 16
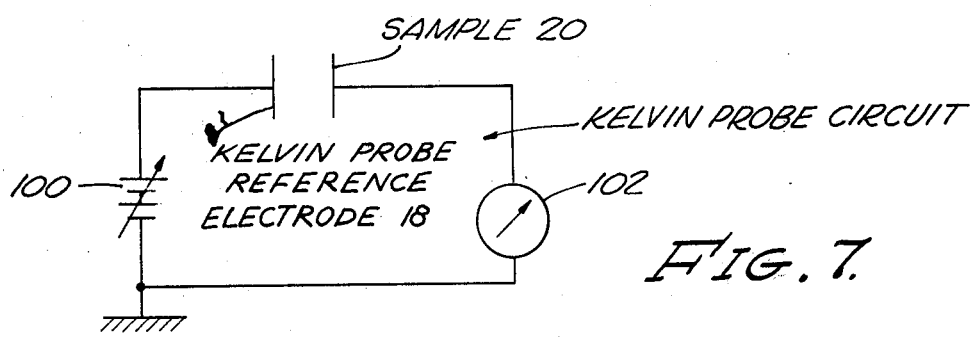
FIG. 7. SAMPLE 20 / KELVIN PROBE REFERENCE ELECTRODE 18 / KELVIN PROBE CIRCUIT / 100 / 102
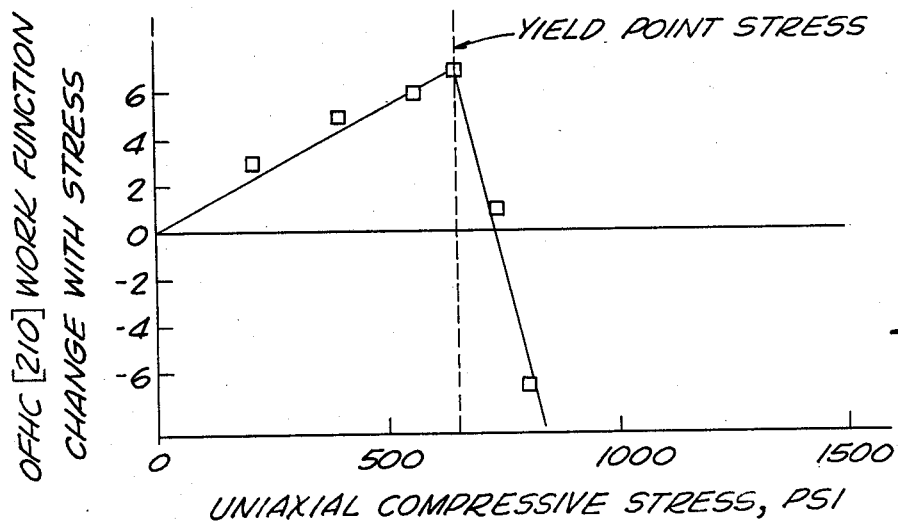
FIG. 8. YIELD POINT STRESS / OFHC [210] WORK FUNCTION CHANGE WITH STRESS vs. UNIAXIAL COMPRESSIVE STRESS, PSI

INSTRUMENT FOR DETECTING THE PLASTIC FLOW POINT OF A METAL

BACKGROUND OF THE INVENTION

Plastic deformation of a material, such as metal, is the permanent change in shape of the material which occurs under the action of opposing forces, as a result of the stress on the material exceeding the elastic limit of the sample. Below the elastic limit, the material changes its shape and size under the action of opposing forces, but recovers its original configuration when the forces are removed. The forces acting on the material are expressed as stresses and are measured as force per unit area. The resulting strain in the material is measured by the ratio of change in length/original length.

According to Hooke's Law, below the elastic limit of the material, stress is proportional to strain, and the ratio of stress to strain is a constant (E). This constant (E) is known as Young's Modulus of Elasticity of the material. However, when the elastic limit of the material is reached, plastic deformation occurs, and (E) is no longer a constant. In contrast to elastic deformation, plastic deformation is irreversible, and it results in permanent changes in the shape of the material. No simple relationship between stress and plastic strain, analagous to Hooke's Law for elastic behavior, exists, after the yield point has been passed.

The primary process responsible for plastic behavior is slip. This process is one in which large deformations are accomplished by sliding blocks of the crystal over one another along definite crystallographic planes, called slip planes. As one portion of the crystal is sheared an integral number of atomic spacings with respect to its neighbor along the slip plane, the natural result is the production of a step when the disturbance reaches the surface. Since a sliding action takes place, it is obviously a shear stress that activates the process, and the volume of the sample remains constant during deformation. The instrument of the invention is predicated on the principle that plastic deformation takes place through dislocation movement, and it serves to detect the dislocation intersection with the surface of the sample as evidenced by a change in work function.

The instrument of the invention provides a precise means for detecting the yield point in the sample at which plastic deformation first occurs, by sensing a change in the work function at that point.

A metal sample exhibits certain electronic responses due to stresses of an applied load. The electronic responses to the applied load are changes induced in the electronic properties of the metal sample by the external stimulus. These changes are indirect and result from the new ion/electron equilibrium created by the external stimulation's distortion of the periodic crystallographic lattice of the metal. The electronic properties involve the "work function" of the metal. Work function is a quantity with the dimensions of energy, and it determines the thermionic emission of the metal at a given temperature.

Work function is usually expressed in electron volts. It varies from one crystal plane to another, and it also varies slightly with temperature. For a metal, the work function has a simple interpretation. At absolute zero, the energy of the most energetic electrons in a metal is referred to as the Fermi Energy, and the work function of a metal is equal to the energy required to raise an electron with the Fermi Energy to the energy level corresponding to an electron at rest in a vacuum.

More simply, the work function of a material is the work required to extract an electron from the bulk of the material, and place it just externally to the surface of the crystal plane from which it was extracted. Therefore, the work function of the material will change with the crystallographic orientation of the particular face through which the electron was removed. However, the work required to remove an electron to infinite separation from the surface of the crystal plane from which it was extracted is not dependent on the face through which the electron was extracted. A surface or external charge redistribution occurs in the latter case to blot out the crystallographic dependence of the work function at large distances. For the purposes of the instrument of the present invention, therefore, "work function" is defined as the energy necessary to remove the electron to just the separation from the surface where the surface field has been fully developed, and the blotting effect is being initiated, so that for all intents and purposes it is crystallographically dependent.

Work function has also been defined as the sum of the chemical potential of the electrons (inner work function) and the surface dipole moment (surface contributions). When metallic bodies of differing work function are brought into contact, the Fermi Energies become identical, as described below, and the work function differential will manifest itself as a difference in the respective surface dipole moments. Since these are now measured from the same internal potential (Fermi Energy), however, the difference will exist entirely as a difference in the external potential energy of an electron just ahead of the surface. Since a metal is a conductor, this potential energy difference can only result from development of surface charges, $Q_s$, on the respective surfaces.

A requirement of thermal equilibrium between the bodies on contact is that the electro-chemical potential of any specie must be constant throughout the entire system. In a metal the electro-chemical potential of electrons and the Fermi Energy are synonymous. Thus, when metallic bodies are brought into contact, the Fermi Energy of the electrons in each body will be identical, as referred to above. This occurs through redistribution of electrons in the various potential fields. Contact potential is then defined as the potential existing across the space between two electrically connected metals of differing work function, arranged as a parallel plate capacitor. This potential arises as a requirement of thermal equilibrium and is identical to the work function difference between the two metals.

For example, consider two metals M1 and M2 with work functions $\phi_1$ and $\phi_2$ respectively. When the metals are brought in contact, the Fermi levels, that is, the levels corresponding to the most energetic electrons, must coincide. Consequently, if $\phi_1$ is greater then $\phi_2$, metal M1 will acquire a negative surface charge $Q_s(-)$, and metal M2 will acquire a positive surface charge $Q_s(+)$ with respect to one another. If two metal plates M1 and M2 are spaced from one another in a vacuum, there will thus exist a potential difference between the plates such that M1 is a negative with respect to M; the magnitude of the contact potential is equal to $\phi_1-\phi_2$ or $$\frac{Q_s(1)}{e} - \frac{Q_s(2)}{e}$$

where $e = 1.6 \times 10^{-19}$ coulombs.

The work function of a metal may be determined by measuring the photo-emission of a metal sample as a function of the frequency of the incident electromagnetic radiation. It may also be determined by measuring the contact potential of the metal sample with respect to a known standard by means, for example, of a Kelvin probe, as is used in the embodiment of the invention to be described.

An impulse type of Kelvin probe or a vibrating type may be used to measure the contact potential. The impulse probe was developed by Lord Kelvin many years ago, and it has been replaced to some extent in recent years by a vibrating Kelvin probe developed by Zisman. Both types of probe are based on a parallel plate capacitor principle, and their difference lies in the mode of capacitance change used to excite the probe circuit.

In either probe, the contact potential differential of the capacitor plates is measured by placing a variable electromotive force in the external probe circuit, which is balanced to make the potential difference between the plates equal to zero.

The instrument of the invention uses such a probe, or its equivalent, to determine the stress induced work function changes of a sample, and to detect the point at which the work function changes significantly, thereby determining the yield point of the sample, and the onset of plastic deformation.

The instrument may include a vacuum chamber so that the contact potential measurements are made with a high degree of sensitivity in a vacuum environment, after a surface cleaning operation. In this way the detected work function changes are completely due to dislocation intersection with the surface which manifests plastic deformation, and not due to any absorbed atom effects. However, for all practical purposes the measurements may be made under normal ambient conditions.

The various mechanisms which make up the instrument in one of its embodiments include, a Kelvin probe of the pulse or vibrating type, a sample holding mechanism for imparting linear motion to the sample; a mechanism for imparting linear motion to the Kelvin probe; and a stress-inducing mechanism, including a stress action arm and a stress reaction arm, for exerting a stress on the sample. These various instrumentalities may be aligned within the instrument for movement of the sample along the X-axis, for movement of the Kelvin probe along the Z-axis, and for movement of the stress-inducing mechanism along the Y-axis. Alignment along the three axes may be achieved by the use of laser optics. Alignment to orthogonality may be achieved by adjustment of gimbals on the stress action and reaction arms. Alignment of the Kelvin probe may be carried out in the same manner. The Kelvin probe may comprise a square piece of gold-plated molybdenum utilized as a known standard which faces the sample, and which forms with the sample, the two capacitor plates of the probe.

Compressive stresses may be employed in the instrument since all bulk pieces of metal, such as tensile grips, within the vicinity of the sample affect the sensitivity of other measurements to be made in a scientific experiment, photo-emission measurements would be an example of such measurements. For that reason, the sample is held in a pliers-like sample holder, in a constructed embodiment, with the sample being held in the jaws of the pliers, and with the compressive load being applied to external bearing surfaces on the handles of the pliers. In the operation of the instrument, the sample holder is moved into a particular position with respect to the Kelvin probe, and the action stress arm and reaction stress arm are moved against the external bearing surfaces of the sample holder, so that the desired compressive load may be applied to the sample.

With the Kelvin probe and the sample being arranged as a parallel plate capacitor, the work function difference will appear as a voltage across the capacitor. This voltage is independent of plate spacing since it arises solely from the work function difference of the two plates. This is the case whether the bodies are contacted directly, or a circuit is used for external connection, since only the internal portions of the work function are important, and these internal portions are constant throughout the entire system, including the external circuit.

The definition of capacitance is:

$$C = Q/V = kA/d$$

Where:
  $Q$ is the charge
  $V$ is the voltage
  $A$ is the plate area
  $d$ is the inter plate spacing Therefore, a change in capacitance through a spacing change at constant voltage must be accompanied by a change in Q. Thus, current will flow in an external circuit connecting two bodies of different work function if their relative positions are changed. This current flow can be monitored, and a reverse null potential applied to eliminate it. The null potential will be a measure of the work function difference of the two plate materials. This is the basis of the Kelvin probe measurement of work function differences between bodies.

The impulse Kelvin probe operates in the manner described above, to create a DC signal, however, as mentioned, a vibrating Kelvin probe, or other suitable equivalent instrumentality, may be used to create an AC signal.

Trial and error are used to find the null voltage, with spacing of the probe electrode and the sample being manually varied after each change of applied potential. In practice, it is not necessary to find the null point exactly since the current reverses at the null point, so only the voltage increment over which the current changes sign is significant, and a 1/10 millivolt increment is easily attainable at that point. The sensitivity of any contact potential measurement is obviously determined by the precision with which small currents can be observed. Since this precision is limited by the detector employed, care must be taken in the construction of the instruments so that detectable currents will be found near the null voltage.

The foregoing depends upon the capacitance change used to activate the circuit. Thus, either plate area or electrode excursion must be made consistent with the requirement of minimum sensitivity necessary. Larger excursions, i.e. changes in inter-electrode spacing, allow smaller plate areas at fixed sensitivity, and vice versa. In addition, small excursions require smaller nominal inter-electrode spacings at fixed plate area and sensitivity in the instrument, the plate area is fixed, and only excursion and interelectrode nominal spacing are varied.

The reference electrode of the Kelvin probe used in the constructed embodiment, as mentioned above, is a ¼ inch square molybdenum plate coated with gold by vapor deposition in a vacuum. The gold coating was selected since it was known that gold could attain a constant work function in a vacuum. It was also found that a copper reference electrode also exhibited a characteristically stable work function as did gold.

As the instrument of the invention is predicated on the principle that the onset of plastic deformation in a metal at the yield point results in a large and easily identifiable work function change, the instrument measures work function changes induced by plastic deformation to detect the onset and existence of plastic deformation, and thereby to serve as a basis for a nondestructive test instrument for structural alloys, and the like. The metal sample is stressed in the instrument of the invention in a vacuum, rather than in air, so that absorption effects which could obscure the sign as well as the magnitude of the response of the bare metal work function to the applied stress may be eliminated. However, as noted above, for practical purposes the measurements may be made under atmospheric pressure conditions. This was found and could only be found, to be the case through use of the constructed embodiment of the invention described here.

BRIEF DESCRIPTION OF THE DRAWINGS

FIG. 5 is a perspective representation of a sample carrier, which is mounted within the vacuum chamber of the apparatus of FIG. 1, for movement along respective axes within the chamber;

FIG. 6 is a view like FIG. 5, but with the sample removed from the sample carrier, to reveal internal heating elements within the sample carrier;

FIG. 7 is a circuit diagram of the external electric circuit which is connected to the Kelvin probe; and FIG. 8 is a curve illustrating the stress induced work function change of the sample, including that occuring at the onset of plastic deformation.

DETAILED DESCRIPTION OF THE ILLUSTRATED EMBODIMENT

Figure 1:
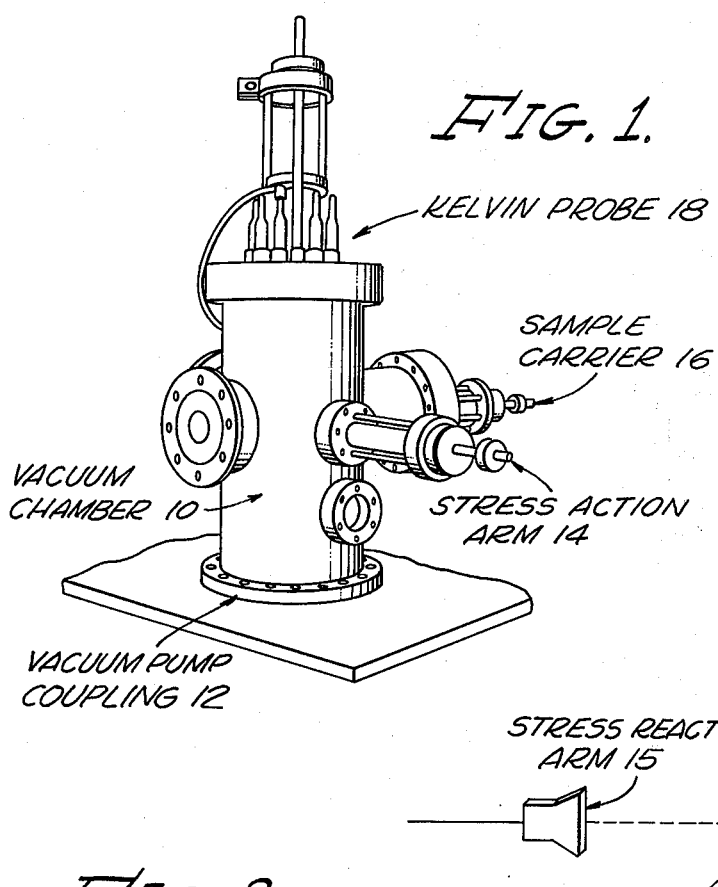
FIG. 1 is a perspective representation of apparatus constructed in accordance with one embodiment of the invention, in which the measurements are carried out in a vacuum, although, as mentioned above, a vacuum environment is not essential to the operation of the apparatus.

The apparatus of FIG. 1 includes a vacuum chamber 10, which may be a welded type stainless steel chamber having an ultrahigh internal vacuum environment. Varian conflat flanges, such as the flange 12, are used to couple to vacuum pumps and other components to the vacuum chamber. In a constructed embodiment, both a Noble VAc-Ion pump and a Varian Titanium Sublimation pump are used to obtain vacuum pressures within the vacuum chamber of the order of $5-10^{-11}$ Torr. A Varian Nude Ion gauge was used to monitor pressure inside the vacuum chamber.

The vacuum chamber 10 is evacuated in the constructed embodiment by connecting a roughing station containing Varian Vac-Sorb (molecular sieve) pumps, as well as Noble Vac-Ion and Titanium pumps, after completing bolt-down of all flanges. The Vac-Sorb pumps are cooled to liquid nitrogen temperature and opened to the system resulting in a vacuum of $10^{-1}$ Torr. After then valving off the Vac-Sorb pump, the Titanium pump and Noble ion pump of the roughing station are slowly opened to the system while maintaining the Noble Ion pump current below 50 milliamps. The Noble Ion pump has a peak efficiency at this current. In this manner, vacuum pressures of $10^{-7}-10^{-8}$ Torr may be obtained.

Rough-out is then followed by heating the main station pumps to 350°C. with heating tapes for a few hours, and then placing a heating oven on the vacuum chamber 10. The heating oven raises the temperature of the vacuum chamber to 180°C. Rough pumping is continued in this condition until the pressure stabilizes at about $10^{-8}$ Torr, at which point the main station pumps are allowed to cool to room temperature. This requires several hours, at the conclusion of which the roughing station is valved off and the main station pumps turned on. Pressures of below $10^{-9}$ Torr are obtained then with the main chamber hot. The main chamber is allowed to cool to room temperature. Vacuum pressures of $1-15 \times 10^{-11}$ are obtained approximately 1 day after cool-down.

Prior to the evacuation of the vacuum chamber 10, the other components of the apparatus are mounted on the vacuum chamber by means of Varian Con-Cap Flat flanges. These flanges utilize annealed copper gaskets which are plastically deformed during bolt down, to obtain an ultra-high vacuum seal.

Figure 2:
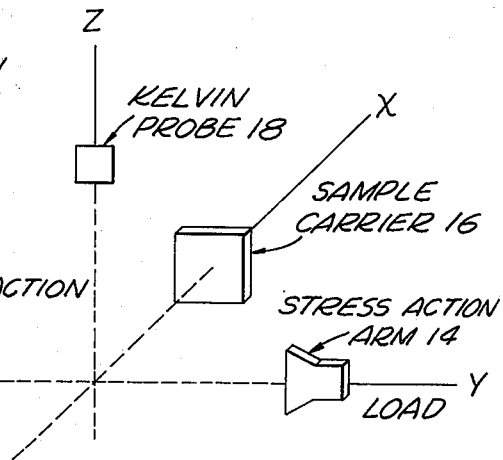
FIG. 2 is a schematic representation of the various components in the apparatus of FIG. 1, and the axes along which the various components are moved within the vacuum chamber of the apparatus.

The apparatus includes, for example, a stress action arm 14 which extends into the interior of the vacuum chamber 10 for movement along the Y-axis, as shown in the schematic diagram of FIG. 2. A stress reaction arm 15 (FIG. 2) is mounted within the vacuum chamber 10 in axial alignment with the stress action arm 14. A sample carrier 16 also extends into the interior of the vacuum chamber 10 for movement along the X-axis, as shown in FIG. 2. Finally, a Kelvin probe reference plate electrode 18 extends into the vacuum chamber 10 for movement along the Z-axis, as shown in FIG. 2. In each case, Varian Con-Flat flanges may be used a vacuum seals for mounting the various components on the vacuum chamber 10.

Therefore, as shown in FIG. 2, the sample is moved on the sample carrier 16 along the X-axis, the Kelvin probe reference plate electrode is moved along the Z-axis, and the load-inducing stress action arm 14 is moved along the Y-axis. Alignment of the various components within the vacuum chamber 10 is achieved, for example, by the use of laser optics, as described above. A clean surface heat preparation is carried out by means, for example, of an alumina coated tungsten heating element 22 positioned within the sample carrier 16 to be just behind the sample, as shown in FIG. 6. The sample is heated to high temperatures within the vacuum chamber by the heating element to remove its surface oxide films and the like.

As mentioned above, compressive stresses are employed in the illustrated embodiment to accommodate the Kelvin probe measurements in-situ. For that purposes, the sample carrier 16 is shaped to have a pliers-like configuration, with the sample 20 (FIG. 5) being supported in the jaws of the pliers, and with the compressive load being applied to the handles of the pliers through the stress action arm 14 of FIG. 4 and the stress reaction arm 15 of FIG. 3.

Figure 3:
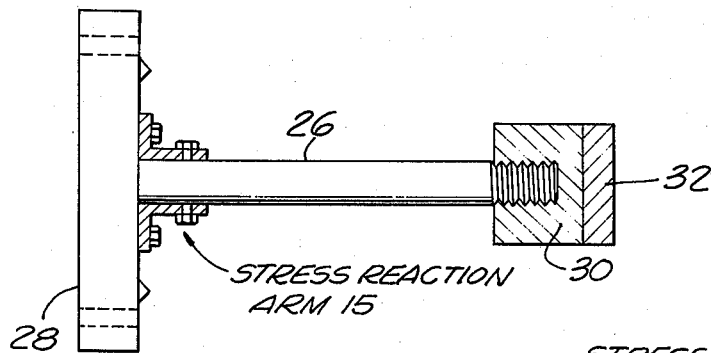
FIG. 3 is a side elevation of a stress reaction arm which is mounted within the vacuum chamber of the apparatus of FIG. 1.
Figure 4:
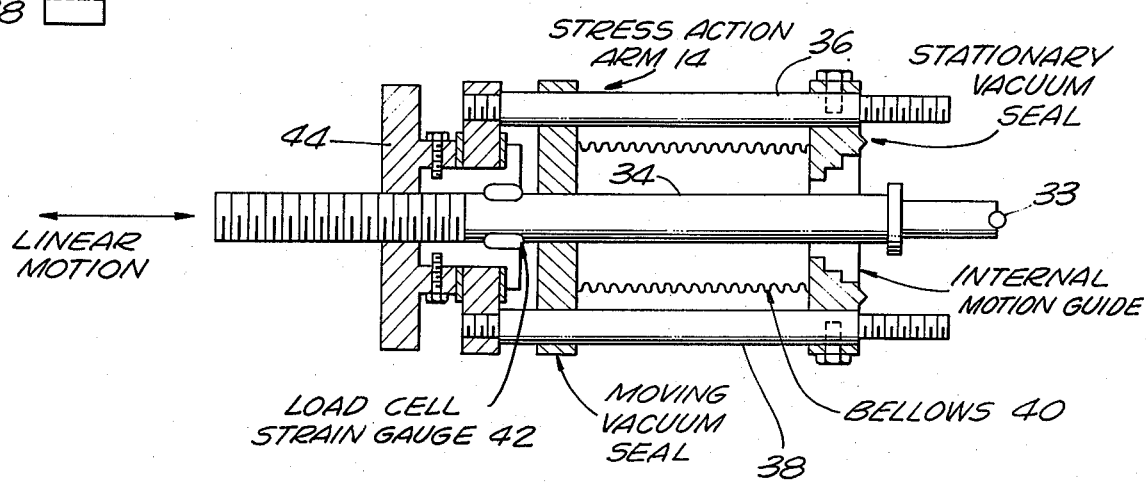
FIG. 4 is a side elevation of a stress action arm which is mounted within the apparatus, which is axially aligned with the stress reaction arm of FIG. 3, and which is movable reciprocally towards and away from the stress reaction arm.

As shown in FIGS. 3 and 4, the stress action arm 14 involves a linear motion, while the stress reaction arm 15 does not. The stress reaction arm, for example, includes an elongated bar member 26 which may, for example, be a ⅜ inch diameter type 304 stainless steel bar stock. The stress reaction arm is butted up against a plate 28 which is mounted, for example, on a Varian Con-Flat flange at one side of the vacuum chamber 10. In the constructed embodiment, the stress reaction arm 15 is of the order of 5 inches in length.

A rectangular block 30 is threaded to the free end of the rod 26 of the stress reaction arm 15, and it has an alumina coating on its bearing face 32. The bearing face 32 of the block 30 engages one of the handles of the pliers section of the sample carrier 16, as the bearing member 33 at the end of the rod 34 of the stress action arm 14 of FIG. 4 is moved against the other handle of the pliers section, so that the stress action arms 14 and the stress reaction arm 15 exert a force against the handles of the pliers section, causing the jaws of the pliers section to exert a compressive force on the sample 20. The bearing member 33 may also be formed of alumina.

As shown in FIG. 4, the stress action arm assembly 14 includes a pair of guide rods 36 and 38 which are supported on one of the Varian Con-Flat flanges by means of their right hand threaded ends. The right hand tip of the rod 34 extends into the interior of the vacuum chamber 10, a vacuum seal being formed by a bellows 40. A strain gauge 42 is supported on the other end of the guide rods 36 and 38, as is a stationary nut 44. The rod 34 is threaded through the stationary nut 44, and it is turned to produce a linear motion of the bearing member 32 along the Y-axis in FIG. 2, and against the handle of the pliers section of the sample carrier 16 of FIG. 5. The rod 34 may be a ¾ inch diameter type 304 stainless steel bar stock, and in the constructed embodiment, it has a length the order of 7 inches.

As described above, the strain gauge 42 is mounted on the action arm 14, and the arm may then be converted into a load cell by calibrating the strains developed in the arm at various loads with a secondary standard proving ring. Stress is also monitored during the operation of the apparatus, so that the electronic response may be obtained as a function of strain as well as stress.

The Kelvin probe reference plate electrode 18 is movable along the X-axis of FIG. 2. As mentioned above, the plate electrode 18 may be a molybdenum plate coated with gold by vacuum vapor deposition, or formed of copper, or other material having a stable work function characteristic.

In the operation of the instrument, the reference plate electrode 18 of the Kelvin probe is moved along the Z-axis to a predetermined origin position, and the sample 20 is moved along the X-axis toward the reference electrode 18. During the latter operation, the capacitance between the sample and the reference electrode is monitored by an appropriate inductance-capacitance meter. In the constructed embodiment, it has been found by trial and error that a capacitance of 9 picofarads represents the optimum inter-electrode spacing between the sample and the reference electrode. This optimum inter-electrode spacing is of the order of 0.001 inches.

A potentiometer 100 (FIG. 7), (which may be a Leeds and Northrup K3 potentiometer), suitable dry cells and a standard reference cell, together with an electrometer 102, are connected in circuit with the reference plate electrode 18 and sample 20, as shown in FIG. 7. The electrometer 102 may be a vibrating reed, Kiethely 640 electrometer. Low capacitance coaxial leads may be used for connecting the various elements together.

As a preliminary adjustment, the electrometer 102 is set to low sensitivity, so that a rough determination of the null voltage may be made by varying the potential applied by the potentiometer to the reference electrode 18. As the stress on the sample is increased, and as the contact potential decreases towards a point at which the sign of the current reverses, the sensitivity of the potentiometer is increased to a point at final determination of 0.25 millivolt interval, at which a full scale current of $10^{-15}$ amperes is used.

The work function changes induced by compressive stress in the apparatus of the invention are shown, by way of example, in the curve of FIG. 8. As shown by the curve, for a 210 crystallographic face of an OFHC copper sample, elastic compression produces an increase in the work function. A sharp change is observed in the work function in the range of 700–900 psi. This change is a decrease in the work function. The sharp change in work function is due to the onset of plastic flow, and the change occurs at the yield point of the sample, so that the work function change observed by the circuit of FIG. 7 changes sign at the yield point.

The instrument of the invention is capable, therefore, of detecting the sudden change in sign in the response of the work function of a sample to an applied stress, which change is caused by the onset of plastic flow in the sample, and which change is a precise indication of the yield point of the sample material. The effects of surface contamination may be eliminated in the instrument, by carrying out the measurements in a vacuum environment, and by surface cleaning the sample while in the environment, as is the case of the particular embodiment described above. However, as previously mentioned, usually the effects of surface contamination are sufficiently insignificant to permit the measurements to be carried out under normal atmospheric pressure conditions. Although the particular embodiment of the invention exerts a compressive strain on the sample, experimentation has shown that whatever the crystallographic orientation of the surface of the sample, or the sign of the applied stress, plastic deformation will be accompanied by a large decrease in the work function.

It will be appreciated that although a particular embodiment of the instrument of the invention is shown and described herein, modifications may be made. It is intended in the claims to cover the modifications that come within the spirit and scope of the invention.

What is claimed is:

1. Apparatus for detecting the plastic flow point of a sample, the sample having a shape and composition to function as one plate of a parallel plate capacitor, said apparatus including in combination: a housing; a carrier for the sample movable in the housing along a first axis; a reference plate electrode mounted in the housing in a position at which the sample in the carrier and the reference plate electrode form a parallel plate capacitor; a stress mechanism movable in the housing along a second axis traversing said first axis to exert a stress on the sample in the sample carrier; and an external circuit connected to the parallel plate capacitor formed by the sample and the reference plate electrode to provide electrical voltage indications as the stress in the sample is increased and to detect the point of reversal of current flow through the parallel plate capacitor.

2. The apparatus defined in claim 1, in which said stress mechanism includes a fixed stress reaction arm extending into the housing along the second axis, and a stress action arm movable along the second axis towards said stress reaction arm, said stress reaction arm and said stress action arm having bearing surfaces engaging opposite faces of the sample in the carrier to exert compressive stresses on the sample.

3. The apparatus defined in claim 2, in which said sample carrier has a plier-like configuration to support the sample between jaws formed thereby in position to permit the sample to expose said opposite faces thereof respectively to said reaction arm and to said action arm, and in position to space a further face of the sample from the reference plate electrode to form said parallel plate capacitor.

4. The apparatus defined in claim 1, and which includes means for evacuating the housing to form a vacuum chamber therein.

5. The apparatus defined in claim 4, and which includes electrically energized heating means mounted in the sample carrier to provide a heat cleaning operation to the surface of the sample in the carrier within the vacuum chamber.

6. The apparatus defined in claim 1, in which said external circuit comprises a bridge circuit to provide null voltage indications at said point of current reversal.

7. The apparatus defined in claim 6, in which said bridge circuit includes a potentiometer and an electrometer.

* * * * *